(12) United States Patent
Kateman

(10) Patent No.: US 6,941,858 B2
(45) Date of Patent: Sep. 13, 2005

(54) EFFICIENT MANUFACTURE AND DISTRIBUTION OF CHILLED SOLID FOOD PRODUCTS

(75) Inventor: Paul Kateman, Wellesley, MA (US)

(73) Assignee: Moobella, LLC, Taunton, MA (US)

( * ) Notice: Subject to any disclaimer, the term of this patent is extended or adjusted under 35 U.S.C. 154(b) by 190 days.

(21) Appl. No.: 10/228,439

(22) Filed: Aug. 27, 2002

(65) Prior Publication Data
US 2004/0040449 A1 Mar. 4, 2004

(51) Int. Cl.[7] .............. B65B 55/00; A23C 3/04
(52) U.S. Cl. .............. 99/455; 99/452; 426/399; 426/393; 426/564; 426/565
(58) Field of Search .............. 99/455, 323.1, 99/323.2, 452; 426/130, 393, 399, 410, 565, 564, 566, 567, 392; 62/69, 74, 311, 346

(56) References Cited

U.S. PATENT DOCUMENTS

| | | | |
|---|---|---|---|
| 2,307,234 A | * | 1/1943 | Otting et al. .............. 426/565 |
| 3,542,567 A | | 11/1970 | Finley et al. |
| 4,497,841 A | * | 2/1985 | Wudel et al. .............. 426/565 |
| 5,006,359 A | * | 4/1991 | Senda .............. 426/565 |
| 5,370,893 A | * | 12/1994 | Carey .............. 426/565 |
| 5,753,294 A | * | 5/1998 | Savello .............. 426/580 |
| 5,758,571 A | * | 6/1998 | Kateman et al. .............. 99/455 |
| 5,868,065 A | * | 2/1999 | Haggerty et al. .............. 99/455 |
| 5,925,392 A | * | 7/1999 | Sponholtz .............. 426/130 |
| 6,119,472 A | * | 9/2000 | Ross .............. 62/228.2 |

* cited by examiner

Primary Examiner—Reginald L. Alexander
(74) Attorney, Agent, or Firm—Alison L. McCarthy, Esq.; Mintz Levin

(57) ABSTRACT

An efficient manufacturing and distribution system for food products that are normally served at temperatures well below ambient uses a two stage manufacturing process. In the first stage, a neutral base product is prepared in bulk and is shipped to point of sale at ambient temperatures by common carrier, private trucking, parcel express, mail, etc. At the point of sale, a user selected quantity of it is finished to the specification of the user by aerating it, adding flavorings, mix-ins, etc. as desired, chilling it, and delivering it to the consumer.

18 Claims, 1 Drawing Sheet

EFFICIENT MANUFACTURE AND DISTRIBUTION OF CHILLED SOLID FOOD PRODUCTS

BACKGROUND OF THE INVENTION

1. Field of the Invention

The invention relates to the manufacture and distribution of food products normally sold in chilled form.

2. Background Information

Prepared food products are a major item of commerce in the United States. Typically, such foods are prepared in a factory remote from the consumer, and shipped through various channels of distribution, such as a wholesaler-distributor-retailer chain, to the consumer. Most prepared food products are carried through the distribution chain from the factory to the consumer without intermediate processing or repackaging. Examples of such products include packaged foods such as cereals and breads, among others, in which the product, as it leaves the factory, is sealed in the final package in which it is delivered to the consumer. Other products are commonly shipped in bulk from the point of manufacture, and may undergo either repacking, or further processing, or both, prior to delivery to the consumer. For example, some premium cereals are shipped in bulk to a distribution point such as a retail store, at which point the bulk is broken into consumer-sized portions on purchase by the consumer.

Some frozen foods are commonly shipped in both individually-packaged and bulk form. A common example of this is ice cream, which is typically shipped both in factory-packaged containers in consumer-sized portions such as cups, pints, quarts, and the like, as well as in bulk (e.g., gallon-sized containers) which are then used to deliver smaller-sized servings at the point of sale to the consumer.

Ice cream is one of the most popular food products in the United States, as well as in other countries. However, its need for refrigeration imposes significant costs on its distribution, since special refrigerated vehicles are required for its transportation and storage at all the levels of distribution through which it passes. Indeed, it is typically distributed at −20° F. Thus, the distribution costs are a major component of the price. Further, the cost of refrigeration equipment is often a factor in limiting broader distribution of the product. Additionally, the quality of the product after its manufacture changes markedly with thawing in distribution and storage and with time, and the limited shelf lie further contributes to increasing the cost of the product and limiting its availability.

SUMMARY OF THE INVENTION

The present invention is directed to the efficient manufacture and distribution of normally refrigerated solid food products such as ice cream and the like. For convenience, I refer to these herein as "chilled" products, and intend to encompass by this term not only products which are cooled to a frozen, solid form, but also those which are cooled to a point well below normal room temperature but above the freezing point. By "solid" I intend to include not only products which do not flow unless heated well above the temperature at which they are normally provided to the consumer (e.g., "brick" ice cream), but also products which may be flowable at their storage or serving temperature but not as flowable as (i.e., more viscous than) water, e.g. "milkshakes" or the like.

In accordance with the present invention, a food product such as ice cream which is normally prepared at a factory in fully processed, chilled form is, instead, processed in two distinct stages, the first of which occurs at the factory and the second of which occurs at the time of sale at the point of sale of the product to the consumer.

At the factory, the food product is processed into a "neutral base form", i.e., a form devoid of specific flavorings which will subsequently be imparted to it. In the case of ice cream, the base form is, e.g., a mix of milk, cream, sugar, and often other ingredients (e.g. stabilizers and/or emulsifiers, among others). The base form may be supplied from the factory in either liquid or solid (i.e., dehydrated) form. If supplied in solid form, it is reconstituted at the point of sale, either prior to or in connection with the finishing processing. If it is supplied in liquid form, because it is a dairy-based product, if it is not to be refrigerated during distribution, it must be manufactured and packed under aseptic conditions. This adds to the cost of the end product but this is offset to some extent by the substantial savings realized by obviating refrigeration of the product during manufacture and distribution.

An important aspect of the present invention is that the base product is a "neutral" base product, i.e., it lacks one or more characteristics that will ultimately characterize and define the fully-formed end product. In particular, in the case of ice cream, for example, the base product lacks flavoring that would otherwise characterize it as "vanilla", "chocolate", "strawberry", etc. This enhances the efficiency of the manufacturing process, since facilities and equipment for manufacturing and storing a variety of differentiated products are obviated. Also, at this point, the base product does not have the texture of the finished product, i.e., it is neither frozen nor aerated. Thus, further "constitutive" operations (such as aerating and freezing, among possibly others) that define the nature of the product must yet be performed on the base before it will have the full characteristics of the desired end product.

That the base product need not be cooled during manufacturing or shipping is a further important aspect of the present invention. It enables distribution of the product from the factory to the final points of sale to be greatly facilitated, since special trucking or other special forms of transportation are not required to carry the product. Thus, the neutral base may be shipped by means that are unconventional for products that are normally shipped in refrigerated form. For example, the base and/or flavorings and mix-ins (e.g., chocolate chips, cookie pieces, etc.) may be shipped by parcel post, by express carrier, or by other means, thus enabling distribution at times or to locales which could not justify such a shipment if special transit modes such as refrigerated vehicles were required. Further, it may be carried along with other food products with which it is not normally associated but which may be bringing other products to the distribution center. For example, it may be carried along with deliveries of soft drinks to a particular location. In all these cases, the distribution can be made at ambient temperatures, without special facilities for the base product. This further decreases distribution costs, and increases the efficiency of the present system. Further in accordance with the present invention, the manufacturing of the product is completed at the time of sale, at the point of sale, in serving size portions, to the specification of the end-user, i.e., the customer, with respect to certain of the attributes of the desired end product. The point of sale may be an ice cream stand, a restaurant, a supermarket, a rest stop, one's home or, in general, any location at which final manufacturing equipment is located. For example, for ice cream, the customer selects the flavoring (e.g., "vanilla", "chocolate", "strawberry", etc.); the size of serving (e.g., "small", "medium", "large", "five ounces", etc.); and any desired mix-ins (e.g., nuts, chocolate chips, candies, etc.). The ice cream is then made on the spot, in cooled form, in the requested amount, and to the customer's specification.

A particularly useful apparatus for performing the final manufacturing or processing of the base product is described, in U.S. Pat. No. 5,758,571 issued Jun. 2, 1998 for "Method And Apparatus For Producing And Dispensing Aerated or Blended Fluid Products". The apparatus of that patent forms individually-flavored, cooled, serving-size portions of foods such as ice cream "on the spot" from an unflavored neutral base mix to which flavors and mix-ins such as nuts, candies, etc. are added as desired by the purchaser. The apparatus stores a limited amount of base mix at any given time and individually processes the quantity of mix selected by the consumer by aerating it to give it the desired consistency of ice cream; adding the flavorings and mix-ins; and cooling it. It then serves the resultant freshly-manufactured product in a cup, cone, or other form as may be provided.

At the point of sale, storage requirements are dramatically diminished. Rather than storing a multiplicity of bulk containers for each of a corresponding multiplicity of flavors, some of which may be in infrequent demand but which nonetheless are desired to be on hand to meet the more occasional request, the site need store only the neutral base for any desired product (e.g., a low-fat ice cream, a non-fat ice-cream, etc.), together with a variety of flavorings, mix-ins, and the like for providing desired attributes to the end product. Since flavorings and mix-ins typically constitute only a small percentage (usually much less that 5%) by volume of the final product, a wide variety of flavors and tastes can be accommodated in a small amount of storage. Thus, with only a minimal amount of space, a merchant can offer an unusually wide variety of ice cream flavors made to order, in the desired quantity, on the spot.

DETAILED DESCRIPTION OF AN ILLUSTRATIVE EMBODIMENT

Figure 1:
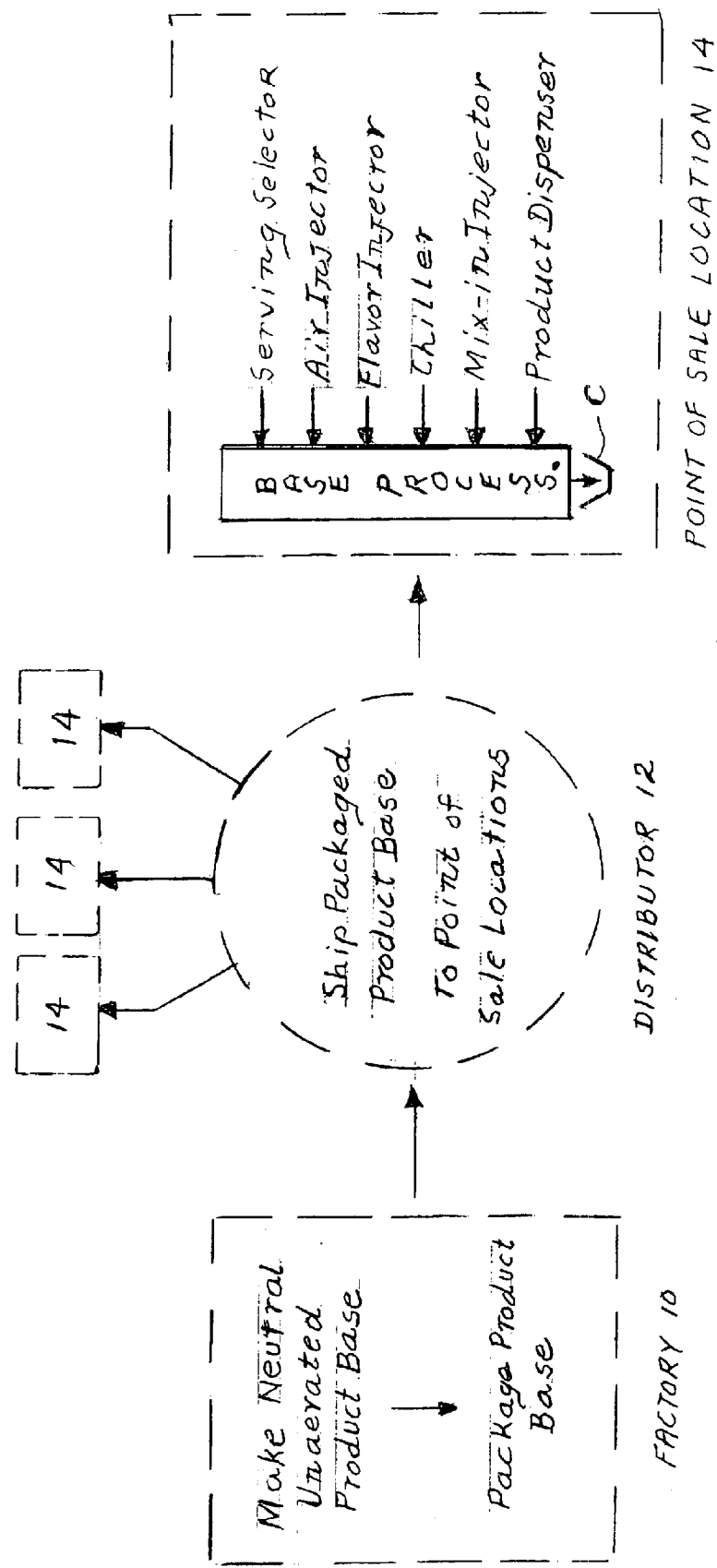
FIG. 1 is a diagrammatic view of my manufacturing and distribution system.

The preferred embodiment of the invention will be described in connection with the manufacture and distribution of ice cream, a product which has normally demanding distribution and storage requirements, which significantly increase its cost. In accordance with the present invention, ice cream is manufactured in two distinct stages, the first of which is performed at a factory in which a neutral base is formed from milk, cream, sugar and stabilizer, and the second of which is performed at the time of sale, at the point of sale, in serving size portions, to the specification of the user with respect to flavor and mix-ins.

As shown in the drawing FIGURE, in a factory 10 the neutral base is preferably manufactured, packaged, and distributed in aseptic liquid form, since it will not otherwise be protected from spoilage by temperature control, such as by refrigeration. The base may also be dehydrated or powdered, which would further reduce shipping and storage costs because the water content would be replaced at the site of making the finished product. The base is packaged for shipment in bulk. In the context of the present inventions, "bulk" means a quantity (by volume, by weight, or by other such measure) that is significantly greater than that of a typical consumer-sized serving. In the case of a food product such as ice cream, for example, a typical consumer-sized serving is commonly measured in single-digit "ounces". For such a product, "bulk", in contrast, might comprise a quantity measured in pounds or tens of pounds (in terms of volume, gallons or tens of gallons).

The base product is shipped by a distributor 12, which may be the same as the manufacturer in unrefrigerated form to point of sale locations 14 where the final processing or final "manufacturing" of the finished product is to take place. These locations 14 may comprise ice cream stands, restaurants, supermarkets, or any other site at which apparatus to manufacture single-serving portions from the bulk neutral base is located. The shipment may be direct from the factory to the distribution site, or may involve intermediate distributors, wholesalers, warehousing, etc.

A key aspect of the distribution is that it is done without requiring deep refrigeration, such as is generally required of ice cream products, which are typically shipped at a temperature of −20° F. in order to prevent spoilage. The equipment to accomplish this is extremely expensive, and this not only greatly increases the cost of distribution, but also further constrains the distribution process, since it is then not economically feasible to deliver the finished product in a pint or two of specialty flavors. In the present method, however, shipment of small quantities may readily be made without significant economic penalty. Even remote non-urban areas which might not otherwise be considered desirable markets because of the cost of distributing product to them may now readily be serviced without greatly increased cost.

The neutral base product is preferably shipped by one or more of the common modes of shipping, such as large-volume trucks and other vehicles. It may also be shipped by transportation modes not commonly used for food products such as ice cream, e.g., by parcel post, by express carriers, and the like. Further distribution savings may be achieved in some cases by delivering the base product to food or beverage manufacturers or suppliers who in turn carry the base, along with their own products, to the distribution-centers. This may be done either on a fee-paying basis, to help the manufacturer or distributor to allay in part the cost of servicing a particular route, or may arise from an ownership interest that the manufacturer or distributor has in some aspect of the distribution process, point of sale locations, etc.

At the end destination, i.e., the point of sale locations 14, the neutral base product is ready for the second, and final, stage of manufacturing. As shown in the drawing, in this stage a selected quantity of the base product, e.g., an individual serving size selected by the consumer, is flavored and aerated; mix-ins are added; and the resultant product chilled to serving temperature. This is typically in the neighborhood of 18° F. for ice cream, but may be warmer or cooler as determined by the machine operator. The processing is preferably performed on a machine of the type described in U.S. Pat. No. 5,758,571 described above. The end product is then "dispensed" in a cone, a cup, or other container C, and served to the consumer.

What is claimed is:

1. A system for the manufacture and distribution of chilled solid food products, comprising:

a factory for manufacturing a neutral unflavored base product;

a distribution system for distributing said base product at ambient temperatures and in bulk quantities to a plurality of point of sale locations;

processing equipment at each of said locations for fabricating a purchaser-selected quantity of said base product into a finished solid chilled food product that has imparted thereto at least one further purchaser-specifiable attribute including a flavor.

2. A manufacturing and distribution system according to claim 1 in which said processing equipment includes:

a plurality of flavor injectors;

refrigerating apparatus for cooling the finished product, and dispensing apparatus for dispensing to a consumer a consumer-size serving of said finished food product of substantially smaller size than the bulk quantities.

3. A manufacturing and distribution system according to claim 2 in which said at least one further purchaser-specifiable attribute includes at least one element selected from the group consisting of candies, toppings, nuts and other ingestible additives.

4. A manufacturing and distribution system according to claim 2 in which said flavor is specified by the consumer at the time of purchase of said finished food product.

5. A manufacturing and distribution system according to claim 4 in which said at least one further purchaser-specifiable attribute includes mix-ins that are to be added to said user-specifiable quantity at the associated point of sale location.

6. The system defined in claim 1 wherein said processing equipment includes an aerating device for aerating the base product prior to the fabricating of said food product.

7. A method of efficiently manufacturing and distributing food products that are normally served at temperatures well below ambient, comprising:

forming a neutral unflavored base product from which a food product is to be created;

delivering said base product in bulk to a consumer point of sale, and at the point of sale, processing a consumer-selected portion of the base product into the desired food product by performing constitutive operations thereon, including at least flavoring and chilling said portion prior to delivering it to the consumer.

8. A method of efficiently manufacturing and distributing food products according to claim 7 wherein said processing includes the step of aerating said portion.

9. A method of efficiently manufacturing and distributing food products according to claim 8 wherein said processing includes the step of adding mix-ins to said portion at the selection of said consumer.

10. A method of efficiently manufacturing and distributing food products according to claim 7 in which said base product is aseptically manufactured and packaged.

11. A method of efficiently manufacturing and distributing food products according to claim 10 in which said base product is shipped at ambient temperatures.

12. A method of efficiently manufacturing and distributing food products according to claim 7 in which said base product is shipped by common carrier.

13. A method of efficiently manufacturing and distributing food products according to claim 7 in which said base product is shipped by mail.

14. A method of efficiently manufacturing and distributing food products according to claim 7 in which said base product is shipped by parcel express.

15. A method of efficiently manufacturing and distributing food products according to claim 7 in which said base product is formed from at least milk.

16. A method of efficiently manufacturing and distributing food products according to claim 15 in which said base product includes cream.

17. A method of efficiently manufacturing and distributing food products according to claim 7 in which said base product is in powdered form.

18. A method of efficiently manufacturing and distributing food products according to claim 7 in which said base product comprises a dairy product formed of at least milk, cream, and sugar.

* * * * *